US012722936B2

(12) United States Patent
Calcagno et al.

(10) Patent No.: US 12,722,936 B2
(45) Date of Patent: Sep. 1, 2026

(54) METHOD FOR CONTROLLING AN ELEVATOR

(71) Applicant: KONE Corporation, Helsinki (FI)

(72) Inventors: Alessio Calcagno, Helsinki (FI); Lauri Stolt, Helsinki (FI); Petteri Kangas, Helsinki (FI); Risto Jokinen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1836 days.

(21) Appl. No.: 16/807,930

(22) Filed: Mar. 3, 2020

(65) Prior Publication Data

US 2020/0283261 A1 Sep. 10, 2020

(30) Foreign Application Priority Data

Mar. 4, 2019 (EP) .................................... 19160536

(51) Int. Cl.
*B66B 1/32* (2006.01)
*B66B 5/00* (2006.01)

(52) U.S. Cl.
CPC .............. *B66B 1/32* (2013.01); *B66B 5/0031* (2013.01); *B66B 5/0037* (2013.01)

(58) Field of Classification Search
CPC ........... B66B 5/02; B66B 1/32; B66B 5/0031; B66B 5/00; B66B 5/16; B66B 5/0018; B66B 5/0006; B66B 1/24; B66B 1/00; B66B 13/14; B66B 13/143
See application file for complete search history.

(56) References Cited

U.S. PATENT DOCUMENTS

| | | | | |
|---|---|---|---|---|
| 4,984,659 A * | 1/1991 | Nomura | .................... | B66B 1/32 187/296 |
| 4,987,977 A | 1/1991 | Nomura | | |
| 2011/0198167 A1* | 8/2011 | Huppunen | ............... | B66D 5/30 188/171 |
| 2020/0002126 A1* | 1/2020 | Saarelainen | .......... | B66B 5/0031 |
| 2020/0283261 A1* | 9/2020 | Calcagno | .............. | B66B 5/0031 |

FOREIGN PATENT DOCUMENTS

| | | | | |
|---|---|---|---|---|
| AU | 2019409946 A1 * | 6/2021 | ............... | B66B 1/32 |
| EP | 2147883 A1 * | 1/2010 | ............... | B66B 1/32 |
| EP | 2 537 790 A1 | 12/2012 | | |
| EP | 3 138 801 A1 | 3/2017 | | |
| EP | 3190076 A1 * | 7/2017 | ............... | B66B 1/32 |

(Continued)

OTHER PUBLICATIONS

Extended European Search Report, issued in Priority Application No. 19160536.9, dated Oct. 11, 2019.

(Continued)

*Primary Examiner* — Jianchun Qin
(74) *Attorney, Agent, or Firm* — Birch, Stewart, Kolasch & Birch, LLP

(57) ABSTRACT

A method includes commanding a brake controller to open a machinery brake, measuring the brake current of the machinery brake, and when the measured brake current does not meet or exceed a predetermined threshold value within a predetermined time period, then generating a signal indicating failure of the machinery brake and cancelling the elevator run sequence, else executing the elevator run sequence.

17 Claims, 5 Drawing Sheets

(56) References Cited

FOREIGN PATENT DOCUMENTS

Figure 1:
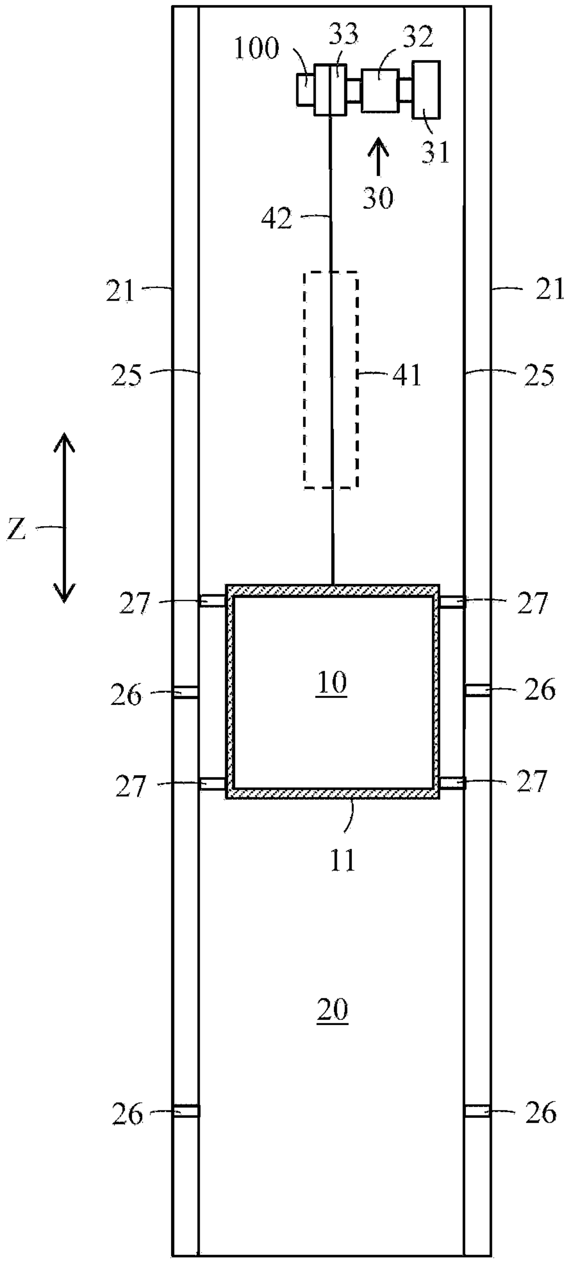

| | | | | | |
|---|---|---|---|---|---|
| EP | 3705440 | A1 | * | 9/2020 | ............... B66B 1/32 |
| EP | 3599200 | B1 | * | 6/2022 | ............... B66B 1/28 |
| FI | 122393 | B | * | 12/2011 | |
| JP | 2008-168981 | A | | 7/2008 | |
| JP | 2008-207898 | A | | 9/2008 | |
| JP | 2016-82656 | A | | 5/2016 | |
| WO | WO 2010/061050 | A1 | | 6/2010 | |
| WO | WO-2020127517 | A1 | * | 6/2020 | ............... B66B 1/32 |

OTHER PUBLICATIONS

European Communication pursuant to Article 94(3) EPC for corresponding European Application No. 19160536.9, dated Mar. 21, 2022.

* cited by examiner

METHOD FOR CONTROLLING AN ELEVATOR

FIELD

The invention relates to a method for controlling an elevator.

BACKGROUND

An elevator may comprise a car, a shaft, hoisting machinery, ropes, and a counterweight. A separate or an integrated car frame may surround the car.

The hoisting machinery may be positioned in the shaft. The hoisting machinery may comprise a drive, an electric motor, a traction sheave, and a machinery brake. The hoisting machinery may move the car upwards and downwards in the shaft. The machinery brake may stop the rotation of the traction sheave and thereby the movement of the elevator car.

The car frame may be connected by the ropes via the traction sheave to the counterweight. The car frame may further be supported with gliding means at guide rails extending in the vertical direction in the shaft. The guide rails may be attached with fastening brackets to the side wall structures in the shaft. The gliding means keep the car in position in the horizontal plane when the car moves upwards and downwards in the shaft. The counterweight may be supported in a corresponding way on guide rails that are attached to the wall structure of the shaft.

The car may transport people and/or goods between the landings in the building. The shaft may be formed so that the wall structure is formed of solid walls or so that the wall structure is formed of an open steel structure.

The machinery brake may be formed of at least one electromechanical brake which is used as a safety device to apply braking force to the traction sheave or the rotating axis of the hoisting machinery in order to stop the movement of the hoisting machinery and thereby also of the elevator car. A machinery brake comprises normally two separate electromechanical brakes. The brakes have to be dimensioned to stop and hold an elevator car with nominal load standstill in the elevator shaft. Additionally, they may also be used in rescue situations and also in emergency braking situations to stop the elevator car if an operational fault occurs, e.g. an overspeed situation of the elevator car. Further, they are used to protect the passengers from unintended car movement at the landing and to provide safe operating environment for the servicemen inside the elevator shaft. It is thus necessary to ensure that the brakes are operating correctly. For example, if the brakes do not open correctly, the brake pad may drag against the traction sheave during the run of the elevator car. This may cause accelerated wear of the brake pad and the brake surface, which may further lead to degradation of the braking force.

Correct opening of the brake may be monitored with a sensor, such as a brake switch, which changes its state when the brake opens. Brake switches may, however, be expensive, unreliable and sometimes difficult to fit into the brakes.

Sometimes the brake switch does not notice that the brake has not opened completely. This means that a brake dragging situation may continue for a longer period, causing problems such as momentary interruptions in the use of the elevator.

The electromagnetic brake may comprise a frame part and an armature part being movably attached to the frame part. Spring means may be arranged to operate between the frame part and the armature part in order to push the armature part away from the frame part when the machinery brake is activated. A brake shoe acting on a brake surface may be attached to the armature part. The brake shoe is pushed against the brake surface when the machinery brake is activated. Electromagnet means may further be arranged in the frame part. The magnetic field of the electromagnet means pulls the armature part against the force of the spring means towards the frame part. The machinery brake is deactivated i.e. the brake shoe is drawn away from the brake surface when the electromagnet is deactivated.

SUMMARY

An object of the invention is an improved method for controlling an elevator.

The method for controlling an elevator according to the invention is defined in claim 1.

The method for testing an elevator machinery brake is defined in claim 9.

The method for controlling an elevator provided with a machinery brake and a machinery brake controller controlling the machinery brake, the method comprising

- a first step in which the brake controller is commanded to open the machinery brake,
- a second step in which the brake current of the machinery brake is measured, wherein
- a third step in which, if the measured brake current does not meet or exceed a predetermined threshold value within a predetermined time period, then a signal indicating failure of the machinery brake is generated and the elevator run sequence is cancelled, else the next step in the elevator run sequence is executed.

According to an embodiment, alternatively or additionally, the third step includes: if the measured brake current does not meet or exceed a predetermined threshold value within a predetermined time period, then a signal indicating failure of the machinery brake is generated and the elevator run sequence is cancelled, else, (immediately) when the measured brake current meets or exceeds the predetermined threshold value, the next step in the elevator run sequence is executed. This means that the run sequence software can proceed immediately to the next step in the run sequence, there is no need to wait for the predetermined time period to expire. The advantage with such a solution is a faster elevator start.

The method provides an improvement in the brake control sequence. The brake current in the brake is tested in order to verify that the brake can open normally. Upon issuing the brake open command, the brake current may be measured for each brake separately. Presence of the brake current provide a prerequisite for the opening function of the brake.

The invention is based on the fact that an indication of a correct brake opening function is received as soon as the brake current is observed in the brake. It is thus not necessary to wait until the brake opens physically in order to establish that the brake functions correctly, it is enough that the brake current in the brake coil is detected.

The method makes it possible to verify, at the beginning of the elevator run or alternatively during monitoring of the condition of the machinery brake, that the machinery brake opens correctly and the risk of brake dragging is reduced, which brake dragging might cause malfunction of the machinery brake.

The method may thus be applied to test a correct opening of the brake during normal elevator operation as well as during a specific brake test sequence.

DRAWINGS

Figure 2:
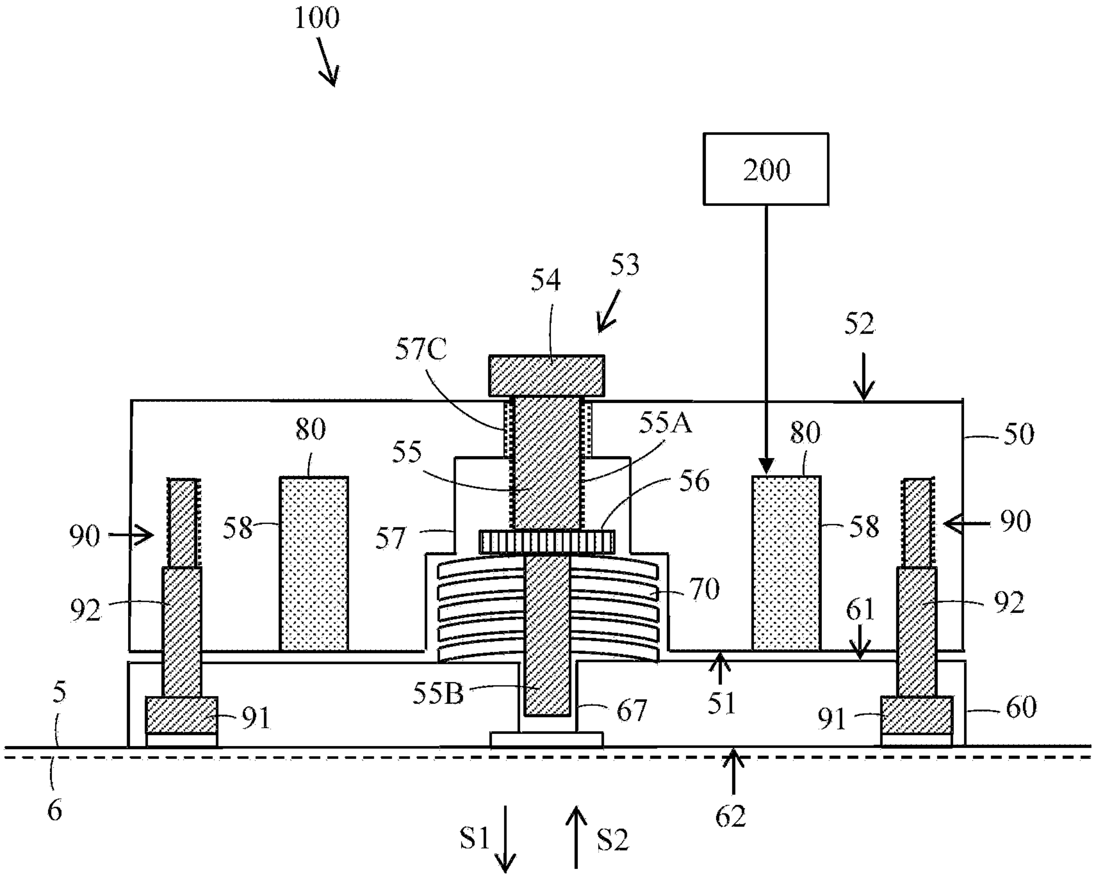
Figure 3:
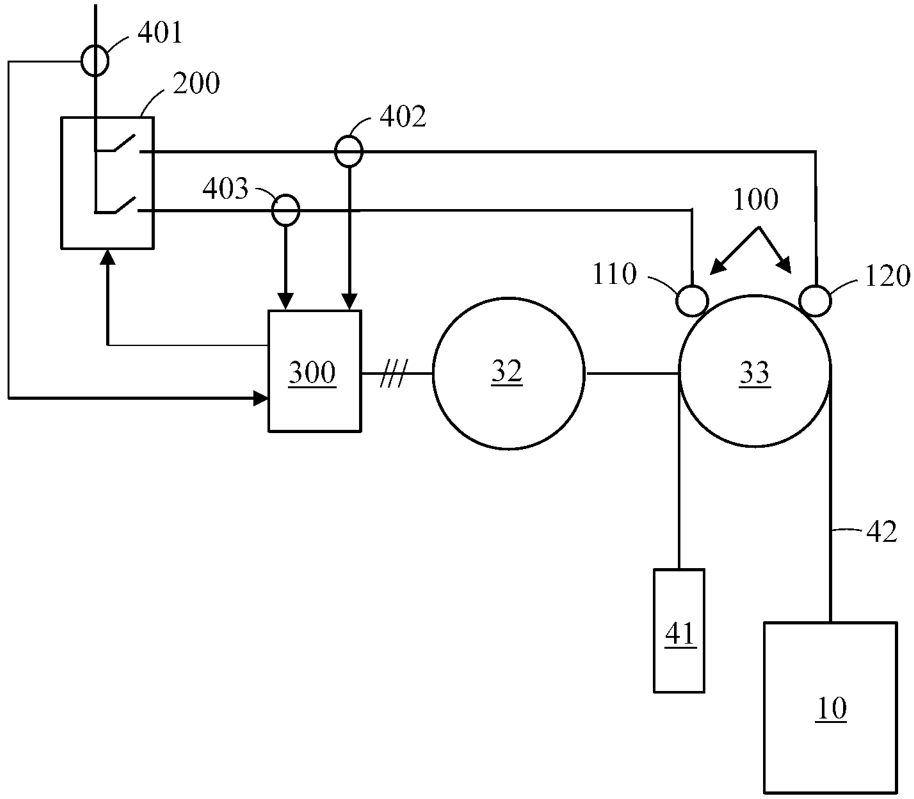
Figure 4:
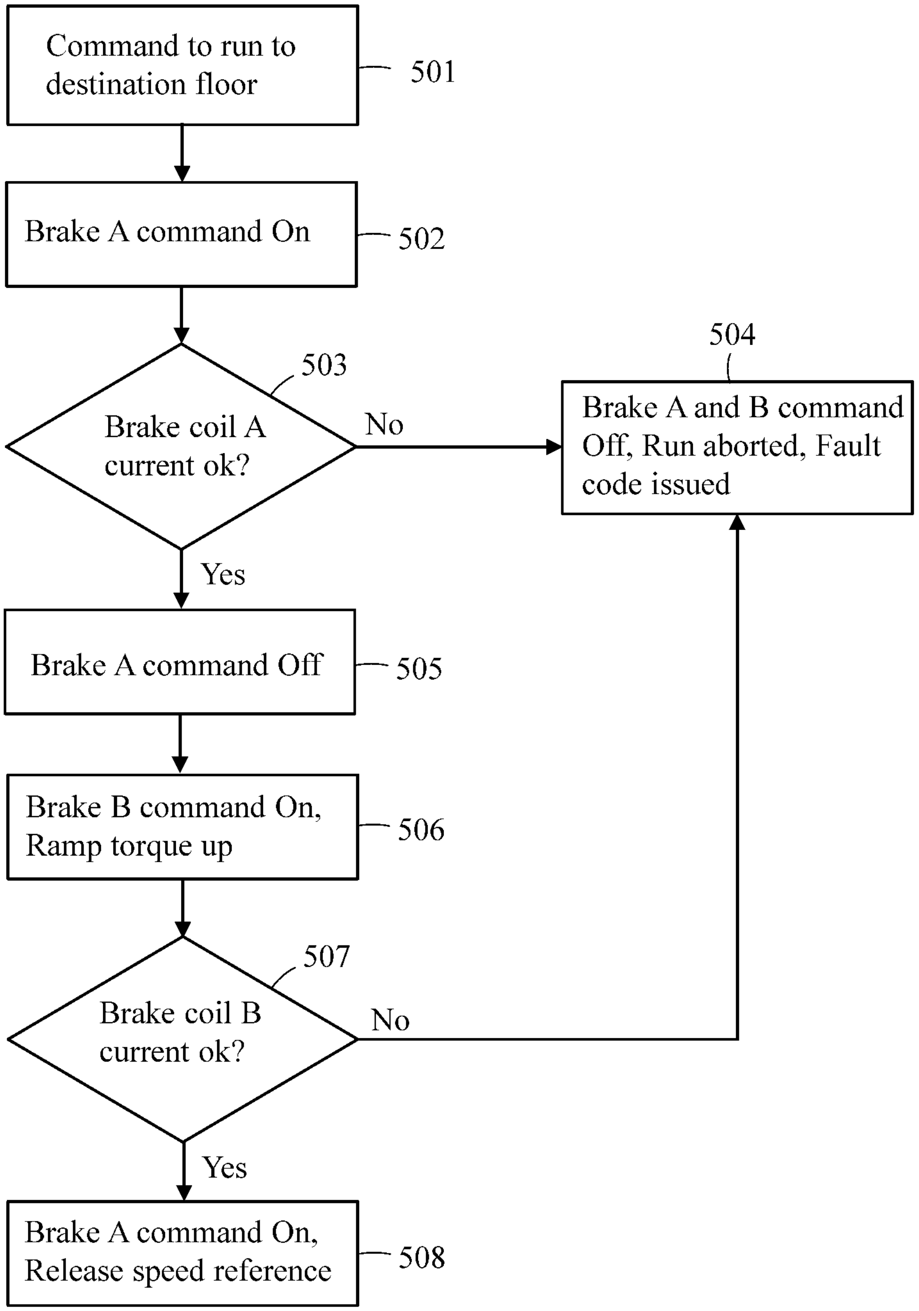
Figure 5:
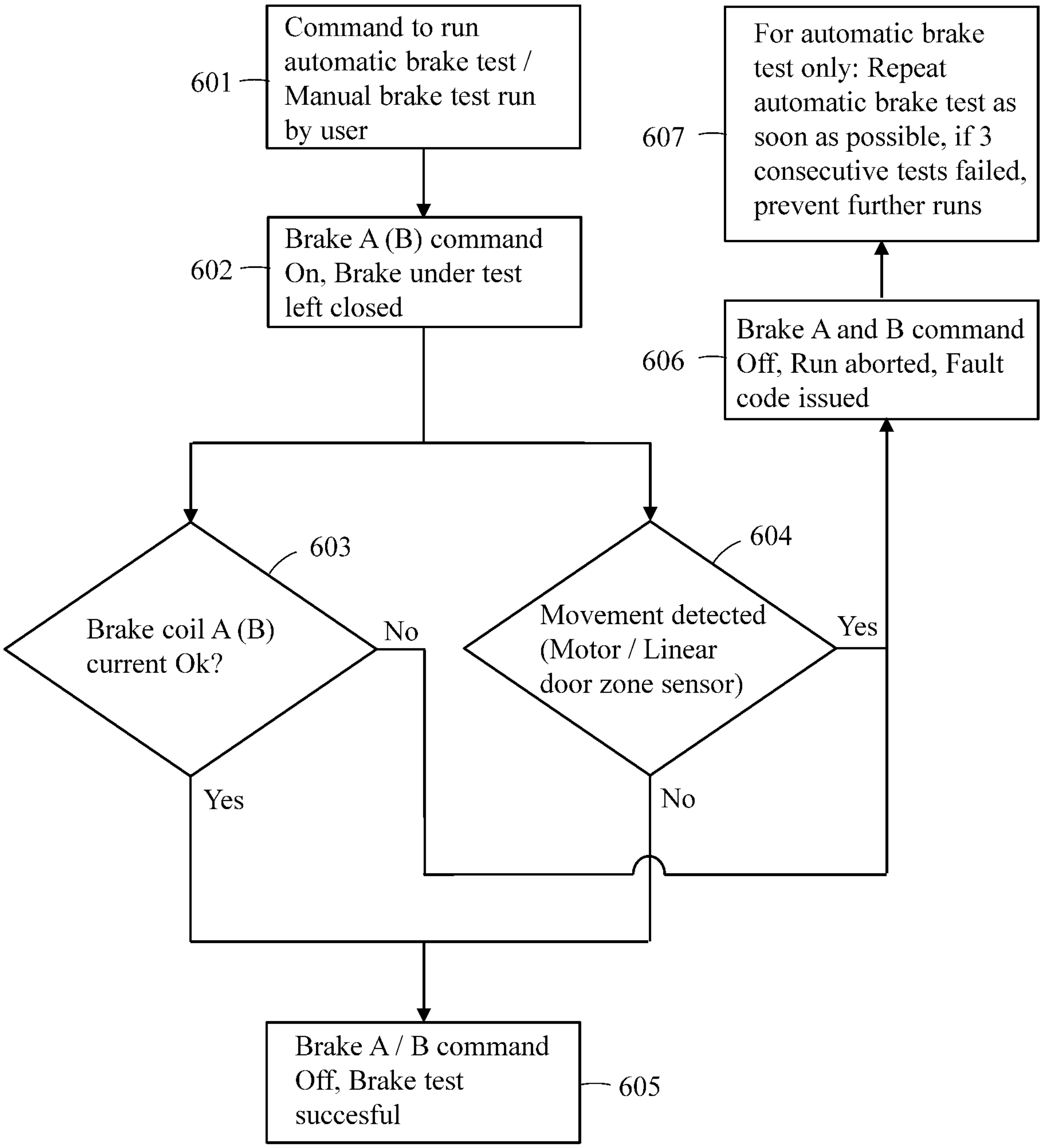

The invention will in the following be described in greater detail by means of preferred embodiments with reference to the attached drawings, in which FIG. 1 shows a side view of an elevator, FIG. 2 shows a cross sectional view of the elevator machinery brake, FIG. 3 shows a side view of an elevator machinery brake system, FIG. 4 shows a first flow diagram of a bake test, FIG. 5 shows a second flow diagram of a brake test.

DETAILED DESCRIPTION

FIG. 1 shows a side view of an elevator.

The elevator may comprise a car 10, an elevator shaft 20, hoisting machinery 30, ropes 42, and a counterweight 41. A separate or an integrated car frame 11 may surround the car 10.

The hoisting machinery 30 may be positioned in the shaft 20. The hoisting machinery may comprise a drive 31, an electric motor 32, a traction sheave 33, and a machinery brake 100. The hoisting machinery 30 may move the car 10 in a vertical direction Z upwards and downwards in the vertically extending elevator shaft 20. The machinery brake 100 may stop the rotation of the traction sheave 33 and thereby the movement of the elevator car 10.

The car frame 11 may be connected by the ropes 42 via the traction sheave 33 to the counterweight 41. The car frame 11 may further be supported with gliding means 27 at guide rails 25 extending in the vertical direction in the shaft 20. The gliding means 27 may comprise rolls rolling on the guide rails 25 or gliding shoes gliding on the guide rails 25 when the car 10 is moving upwards and downwards in the elevator shaft 20. The guide rails 25 may be attached with fastening brackets 26 to the side wall structures 21 in the elevator shaft 20. The gliding means 27 keep the car 10 in position in the horizontal plane when the car 10 moves upwards and downwards in the elevator shaft 20. The counterweight 41 may be supported in a corresponding way on guide rails that are attached to the wall structure 21 of the shaft 20.

The car 10 may transport people and/or goods between the landings in the building. The elevator shaft 20 may be formed so that the wall structure 21 is formed of solid walls or so that the wall structure 21 is formed of an open steel structure.

FIG. 2 shows a cross sectional view of the elevator machinery brake.

The elevator machinery brake 100 may comprise a frame part 50 and an armature part 60.

The frame part 50 may be fixedly attached to a stationary frame construction of the hoisting machinery 30. The armature part 60 may be movably supported on the frame part 50. The movable support should allow movement of the armature part 60 in relation to the frame part 50. The movable support should further transfer the brake torque from the armature part 60 to the frame part 50. Brake torque occurs when the brake shoe 5 comes into contact with the breaking surface 6 of a rotating part of the hoisting machinery to brake the motion of the hoisting machinery 30. The armature part 60 may thus be kept in a position parallel to the frame part 50 during movement of the armature part 60 in relation to the frame part 50. The armature part 60 may move in a first direction S1 and in an opposite second direction S2 in relation to the frame part 50.

The movable support may be realized with support pins 90 passing between the armature part 60 and the frame part 50. The support pins 90 may be formed of bolts. The bolts may have a head 91 and a body 92 extending outwards from the head 91. The body 92 of the bolt 90 may be formed of a first body portion extending outwards from the head 91 and a second body portion having a smaller diameter. The second body portion 92 of the bolt 90 may be provided with an outer threading mating with an inner threading in a corresponding blind bore in the frame part 50.

The frame part 50 may comprise a first surface 51 and a second opposite surface 52. The armature part 60 may also comprise a first surface 61 and a second opposite surface 62. The first surface 51 of the frame part 50 may face against the first surface 61 of the armature part 60. The first surface 51 of the frame part 50 and the first surface 61 of the armature part 60 may be substantially planar.

The frame part 50 may further comprise a first central bore 57 positioned in a middle portion of the frame part 50. The first central bore 57 may extend through the frame part 50 from the first surface 51 to the second surface 52 of the frame part 50. The first central bore 57 may be formed of three consecutive bore portions. Each of the bore portions may have a circular cross-section. The diameter of the first central bore 57 may decrease stepwise in the direction from the first surface 51 towards the second surface 52 of the frame part 50. The bore portion with the smallest diameter at the second end 52 of the frame part 50 may be provided with a threading 57C.

The armature part 60 may further comprise a second central bore 67 positioned in the middle portion of the armature part 60. The second central bore 67 extends through the armature part 60 from the first surface 61 to the second surface 62 of the armature part 60. The second central bore 67 in the armature part 60 may be concentric with the first central bore 57 in the frame part 50. The second central bore 67 in the armature part 60 may be formed of two consecutive bore portions having a circular cross-section with a different diameter.

The elevator machinery brake 100 may further comprise spring means 70 arranged between the frame part 50 and the armature part 60.

The spring means 70 may be fitted at least partly in the frame part 50. The spring means 70 may be supported within the first central bore 57 with a guide pin 53 e.g. a pin bolt extending from the second surface 52 of the frame part 50 through the first central bore 57 into the spring means 70. The guide pin 53 may comprise a head 54 and a body 55 with a threaded portion 55A and a pin portion 55B. The diameter of the threaded portion 55A of the guide pin 53 may be greater compared to the diameter of the pin portion 55B of the guide pin 53. The threaded portion 55A may be threaded in the threading 57C in the first central bore 57 at the second surface 52 of the frame part 50.

A support plate 56 e.g. a washer may be arranged on the pin portion 55B of the guide pin 53 so that the support plate 56 abuts against a step between the pin portion 55B and the threaded portion 55A of the guide pin 53. The spring means 70 may surround the guide pin 53 at least partly. A first end of the spring means 70 may be supported on the support plate 56. A second opposite end of the spring means 70 may be supported on the first surface 61 of the armature part 60. The compression of the spring means 70 may be regulated with the pin bolt 53.

The first central bore 57 in the frame part 50 may receive the guide pin 53, the support plate 56 and the spring means 70. The second central bore 67 in the armature part 60 may receive at least an outer end of the pin portion 55B of the guide pin 53. An outer end of the pin portion 55B of the guide pin 53 may thus move in the first direction S1 and in the second direction S2 in the second central bore 67 in the armature part 60 when the armature part 60 moves in the first direction S1 and in the second direction S2 in relation to the frame part 50. The guide pin 53 forms thus a guide for the spring means 70 acting between the frame part 50 and the armature part 60.

The spring means 70 is pushing the armature part 60 in the first direction S1 away from the frame part 50. The spring means 70 will thus activate the machinery brake 100 in a situation in which the armature part 60 is free to move in the first direction S1.

The frame part 50 may further comprise a ring recess 58 receiving an electromagnet 80. The ring recess 58 may have the form of a ring extending from the first surface of the frame part 50 into the frame part 50. The ring recess 58 may be concentric with the first bore 57 in the frame part 50. The ring recess 58 may accommodate a coil for magnetizing the electromagnet 80. The electromagnet 80 may move the armature part 60 in the second direction S2 against the force of the spring means 70 towards the frame part 50. The electromagnet 80 will thus move the armature part 60 against the force of the spring means 70 in the second direction S2. The machinery brake 100 will be deactivated when the electromagnet means 80 is activated.

At least a middle portion of the frame part 50 i.e. the portion within the coil may be of a ferromagnetic material e.g. of iron forming a core for the coil. A current flowing in the coil magnetises the core of the frame part 50. Magnetization of the core of the frame part 50 will pull the armature part 60 towards the frame part 50. The core concentrates the magnetic flux produced by the current flowing in the coil.

The armature part 60 may be made of a ferromagnetic material e.g. of iron. The armature part 60 will thus be attracted to the core 50 when a current flows in the coil in the electromagnet means 80 in the frame part 50.

The armature part 60 may be attached to a brake shoe 5. The brake shoe 5 may act on a rotating brake surface provided on a rotating part of the hoisting machinery 30. The brake shoe 5 and the brake surface on the rotating part of the hoisting machinery 30 may be planar or curved. The brake could be e.g. a drum brake or a disc brake.

A machinery brake controller 200 may control the machinery brake 100 i.e. the electromagnet 80 in the machinery brake 100. The controller 200 may control the current supplied to the coil in the electromagnet 80.

The machinery brake operates in the following way:

The machinery brake controller 200 keeps the electromagnet means 80 in an activated state i.e. keeps the current supply to the electromagnet means 80 switched on when the elevator is operated in a normal state. The armature part 60 is thus pulled towards the frame part 50, whereby the brake shoe 5 is at a distance from the brake surface 6. The hoisting machinery 30 may thus operate normally.

The machinery brake controller 200 disconnects the current supply to the electromagnet 80 i.e. deactivates the electromagnet 80, when the elevator car 10 is to be stopped. Deactivation of the electromagnet 80 is realized by disconnecting the current flowing through the coil in the electromagnet 80 so that the magnetic field keeping the armature part 60 pulled towards the frame part 50 is disconnected. The spring means 70 will thus push the armature part 60 away from the frame part 50, whereby the brake shoe 5 will be pushed against the brake surface 6. The rotation of the traction sheave 33 will thus be stopped, whereby also the car 10 is stopped.

FIG. 3 shows a side view of an elevator machinery brake system.

The car 10 is hanging on a first side of the traction sheave 33 and the counterweight 41 is hanging on an opposite second side of the traction sheave. The hoisting ropes 42 pass from the car 10 over the traction sheave 33 and to the counterweight 41. The traction sheave 33 is driven by the electric motor 32 which may be formed of a permanently magnetized synchronous electric motor. The machinery brake 100 comprises two electromagnetic brakes 110, 120 acting on the traction sheave 33. The electromagnetic brakes 110, 120 are controlled by a machinery brake controller 200. The elevator and the electric motor 32 of the elevator is controlled by a main controller 300.

There are at least three different options to realize the invention.

A first option would be to determine the proper function of the two brakes 100 one at a time. One common current sensor 401 could be used this first option in order to measure the current supplied to the brakes 100 from the machinery brake controller 200.

A second option would be to determine the proper function of the two brakes 110, 120 simultaneously based on the magnitude of the brake current. One common current sensor 401 could also be used in this second option in order to measure the brake current supplied to the brakes 110, 120 from the machinery brake controller 200. The current sensor 401 must, however, be more accurate in this second option compared to the current sensor 401 in the first option. This is due to the fact that the current sensor must be able to indicate the difference between the current of one brake and the common current of two brakes.

A third option would be to determine the proper function of the two brakes 110, 120 simultaneously based on the brake current supplied to each brake. Two current sensor 402, 403 are needed in this third option in order to measure the current supplied to each of the two brakes 110, 120 from the machinery brake controller 200.

There are several factors affecting the brake current in a machinery brake:

The brake type,
The number of active brake coils,
The temperature of the brake coil,
The line voltage supplied by the elevator control,
The manufacturing tolerances and/or variances of the brake coil.

It is therefore difficult to define a predetermined value for the brake current that would indicate that both brakes are active.

Most of these factors can, however, be eliminated by measuring the actual brake current at every installation at a moment when it is known that both brakes are open. The factors that can be eliminate are at least:

The brake type,
The line voltage supplied by the elevator control,
The manufacturing tolerances and/or variances of the brake coil.

The current limit should be set high enough so that the current level of a single brake is not enough to exceed that limit. In case of dual brakes, both brakes should be of similar type, whereby it is safe to assume that the total brake current is divided equally between the two brakes. The current limit could thus be set in the range of 60 to 75% of the reference total current of the two brakes. This means that when the measured current, in a situation in which both brakes are active, is equal or over the current limit, then both brakes are open, else at least one brake is not open.

One of the best moments to measure the reference total brake current is lift setup drive start due to the fact that:

Setup must be done before the elevator is taken into use,

Both brake coils need to be operative for a successful setup,

There must be somebody present,

Measuring a brake current reference during setup does not add any additional steps to the commissioning process.

In addition to automatic current measurement a possibility of manual current measurement may also be provided in the system. Manual current measurement is needed when maintenance work of the machinery brake e.g. replacing of the brakes is done. A new current measurement is needed after this.

Measurement of the reference brake current must take place at exactly the same moment, in relation to the brake open command, as the later current measurements are done.

Measuring the reference brake current still leaves the problem relating to the variation in the brake current due to variations in the temperature of the brake coil unsolved. The resistance of the brake coil increases as the temperature of the brake coil increases, whereby the brake current decreases. This means that if the brake current limit is set too high, the lift start would unnecessarily fail when the brake coils are hot.

The generic formula for the resistance as a function of the temperature is as follows:

$$R=R_{ref}*[1+\alpha*(T-T_{ref})]$$

where

R=Conductor resistance at temperature T, $R_{ref}$=Conductor resistance at temperature $T_{ref}$, usually 20 degrees Celsius, α=Temperature coefficient of the resistance for the conductor material, T=Conductor temperature in degrees Celsius $T_{ref}$=Reference temperature at which the temperature coefficient α of the conductor material is specified.

The temperature coefficient α for some common materials that may be used in machinery brakes are listed below:

Copper=0.004041
Aluminum=0.004308
Iron=0.005671
Nickel=0.005866
Gold=0.003715
Tungsten=0.004403
Silver=0.003819

Assuming that the brake current is measured at 20 degrees Celsius and the temperature of the brake varies in the interval −10 degrees Celsius to +120 degrees Celsius, then the brake coil resistance relative to the brake coil resistance at the measurement time is (assuming further that the brake coil is of copper):

$$R_{-10^\circ C.}=0.88*R_{+20^\circ C.}$$

$$R_{+120^\circ C.}=1.4*R_{+20^\circ C.}$$

The (total) brake current relative to the current at the measurement time is thus (the inverse value of the previous relationship due to the Ohm's law U=R*I):

$$I_{-10^\circ C.}=1.136*I_{+20^\circ C.}$$

$$I_{+120^\circ C.}=0.71*I_{+20^\circ C.}$$

Assuming further that the brake current in a single brake is 50% of the total brake current we end up with the following relationships:

$$I_{-10^\circ C.}=0.568*I_{+20^\circ C.}$$

$$I_{+120^\circ C.}=0.36*I_{+20^\circ C.}$$

Setting the current limit to 65% of the measured reference current should eliminate the problems relating to the temperature variations. This current limit should eliminate false alarms with hot brakes. This current limit should on the other hand ensure that failure of one brake with cold brakes at low temperatures is detected with clear margin.

The reference current may be measured always at setup start and/or the user may trigger current measurement manually e.g. by setting a parameter value, whereby the current would be measured at next start. The current may be measured 300 ms after the brake open command is given. The current should always be measured regardless of the brake controller type. The measured current value may be stored in a parameter table. The limit value of the current learned at setup when the lift is standing may be shown in a read only mode through a parameter user interface. The measured current value for a specific start may be shown in the user interface when the lift moves.

The brake current needed to open the brake is specific for each brake type and provided by the brake manufacturer. The limit or threshold of the brake current may be set by default to 65% of the measured current value. The limit-% may be adjustable e.g. in the range of 60 to 80%. The brake current is checked 300 ms after the open commands are given i.e. at the same moment when the brake current is measured. If the brake current at start does not meet or exceed the limit, the start fails. The measured brake current meets or exceeds the predetermined threshold value when the measure current is equal to or greater than the predetermined threshold value.

In case any component affecting the brake current is changed e.g. the brake controller or the actual brake, then the brake current measurement must be repeated. In case of false detections and/or failure due to a single brake fault, the user can either adjust the limit with a parameter or repeat brake current measurement at a different brake temperature.

The machinery brake 100 in the figure shows two independent brakes 110, 120. The two brakes 110, 120 may be commanded to open simultaneously at the beginning of a new elevator run sequence, and commanded to open alternatively in connection with a brake test sequence. A machinery brake with two independent brakes 110, 120 is common in most countries e.g. in Europe and in China. However, in some countries as e.g. in the USA, machinery brakes with one main brake and one separate emergency brake is commonly used. In a normal elevator run, only the main brake is used. The emergency brake is only used in emergency situations. The invention may be used in an elevator with a machinery brake comprising only one main brake as well as in an elevator with a machinery brake comprising two independent brakes 110, 120.

FIG. 4 shows a first flow diagram of a bake test.

The first flow diagram of the brake test shown in this figure may be used in connection with the normal drive of the elevator. The machinery brake comprises two brakes A and B.

Step 501 comprises issuing a command to start a new sequence to run to the destination floor. The command to start a new run sequence may be issued on a basis of a service request, which may be received from a call input device of an elevator.

Step 502 comprises issuing a command to the brake controller 200 to open brake A. Opening of brake A is achieved by leading a brake current to the coil in brake A.

Step 503 comprises measuring the brake current and if a break current meeting or exceeding a predetermined threshold within a predetermined time period is detected, then brake A is considered to work properly.

Step 504 comprises, if the answer in step 503 is no, i.e. if the measured brake current does not meet or exceed a predetermined threshold within a predetermined time period, then issuing a command to deactivate the brakes A and B, aborting the run and issuing a fault code.

Step 505 comprises, if the answer in step 503 is yes, i.e. if the measured brake current meets or exceeds a predetermined threshold within a predetermined time period, then issuing a command to the brake controller 200 to close brake A. Closing of brake A is achieved by cutting the brake current to the coil in brake A.

Step 506 comprises issuing a command to the brake controller 200 to open brake B. Opening of brake B is achieved by leading a brake current to the coil in brake B. A command to start raising the ramp torque is also issued.

Step 507 comprises measuring the brake current and if a break current meeting or exceeding a predetermined threshold within a predetermined time period is detected, then brake B is considered to work properly. If the answer is no, i.e. if the measured brake current does not meet or exceed a predetermined threshold within a predetermined timer period, then step 504 is executed i.e. a command to deactivate the brakes A and B is issued, the run is aborted and a fault code is issued.

Step 508 comprises, if the answer in step 507 is yes, i.e. if the measured brake current meets or exceeds a predetermined threshold within a predetermined timer period, then issuing a command to the brake controller 200 to open brake A. Opening of brake A is achieved by leading a brake current to the coil in brake A. The speed reference is also released in step 508, whereby the car 10 starts to move.

FIG. 5 shows a second flow diagram of a brake test.

The second flow diagram of the brake test shown in this figure may be used in a special automatic or manual brake test run. The machinery brake comprises two brakes A and B.

Step 601 comprises issuing a command to run an automatic or manual brake test run.

Step 602 comprises issuing a command to the brake controller 200 to open only one of the brakes brake A, B. Opening of a brake A, B is achieved by leading a brake current to the coil in the brake A, B to be opened. The other brake A, B i.e. the brake to be tested is left closed.

Step 603 comprises measuring the brake current in the brake A, B that was commanded to open in step 602.

Step 604 comprises measuring movement of the elevator. This movement of the elevator may be measured or detected simultaneously as the measurement of the brake current is done in step 603. This movement may be detected e.g. from the rotation of the hoisting motor and/or from the movement of the car in the shaft.

Step 605 comprises, if a brake current meeting or exceeding a predetermined threshold within a predetermined time period is detected in step 603 and if no movement of the elevator is detected in step 604, then the brake that was commanded to open is closed and the brake to be tested has passed the brake test successfully.

Step 606 comprises, if the measured brake current does not meet or exceed the predetermined threshold within a predetermined time period in step 603 or if movement of the elevator is detected in step 604, then brakes A and B are commanded off i.e. the brakes A and B are closed, the run is aborted and a fault code is issued.

(Test steps 602-606 are repeated for both brakes A and B by turns).

Step 607 comprises repeating the automatic brake test as soon as possible and if three consecutive tests failed, then further runs are prevented. Step 607 is only applicable for the automatic brake test.

The use of the invention is not limited to the elevator disclosed in the figures. The invention can be used in any type of elevator e.g. an elevator comprising a machine room or lacking a machine room, an elevator comprising a counterweight or lacking a counterweight. The counterweight could be positioned on either side wall or on both side walls or on the back wall of the elevator shaft. The drive, the motor, the traction sheave, and the machine brake could be positioned in a machine room or somewhere in the elevator shaft. The car guide rails could be positioned on opposite side walls of the shaft or on a back wall of the shaft in a so called ruck-sack elevator.

It will be obvious to a person skilled in the art that, as the technology advances, the inventive concept can be implemented in various ways. The invention and its embodiments are not limited to the examples described above but may vary within the scope of the claims.

The invention claimed is:

1. A method for controlling an elevator provided with a machinery brake and a machinery brake controller controlling the machinery brake, the method comprising the steps of:

commanding the brake controller to open the machinery brake with a brake open command;

measuring the brake current of the machinery brake over a predetermined time after the brake open command;

comparing the measured brake current to a predetermined threshold value; and when the measured brake current does not meet or exceed the predetermined threshold value within the predetermined time period, then generating a signal indicating failure of the machinery brake and cancelling the elevator run sequence, else executing the next step in the elevator run sequence, wherein the machinery brake comprises a first brake and a second brake, the method comprising the steps of:

commanding the brake controller to open only the first brake;

measuring the brake current of the first brake; and when the measured brake current to the first brake meets or exceeds a predetermined threshold within a predetermined time period, then commanding the brake controller to close the first brake and to open the second brake, else commanding the brake controller to close both the first brake and the second brake, aborting the run and issuing a fault code; measuring the brake current to the second brake; and when the measured brake current to the second brake meets or exceeds the predetermined threshold within the predetermined time period, then commanding the brake controller to open the first brake, else commanding the brake controller to close both the first brake and the second brake, aborting the run and issuing a fault code.

2. The method according to claim 1, wherein, before the commanding step, initiating a new elevator run sequence based on a received service request.

3. The method according to claim 2, wherein the predetermined threshold value of the brake current is determined based on a value of the brake current that is needed for opening the specific machinery brake used in the elevator.

4. The method according to claim 2, wherein the brake current is measured in a common branch supplying current to the brake controller.

5. The method according to claim 1, wherein the predetermined threshold value of the brake current is determined based on a value of the brake current that is needed for opening the specific machinery brake used in the elevator.

6. The method according to claim 5, wherein the brake current is measured in a common branch supplying current to the brake controller.

7. The method according to claim 1, wherein the ramp torque of the hoisting motor is turned immediately after the brake controller is commanded to open the second brake.

8. The method according to claim 7, wherein the speed reference of the hoisting motor is released immediately after the brake controller is commanded to open the first brake.

9. The method according to claim 1, wherein the brake current is measured in a common branch supplying current to the brake controller.

10. The method according to claim 1, wherein the brake current is measured separately in each branch supplying current from the machinery brake controller to the respective brake.

11. An elevator comprising:

a main controller; and a machinery brake controller controlling a machinery brake, wherein the main controller controls the elevator according to claim 1.

12. A computer program product embodied on a non-transitory computer readable medium, and comprising program instructions, which, when run on a computer, causes the computer to perform the method as claimed in claim 1.

13. A method for testing an elevator machinery brake comprising a first brake and a second brake, the method comprising the steps of:

commanding a machinery brake controller to open only the first brake;

measuring the brake current of the first brake;

measuring the movement of the elevator;

when the measured brake current meets or exceeds a predetermined threshold within a predetermined time period and no movement of the elevator is detected, then commanding the machinery brake controller to close both the first brake and the second brake, and indicating a successful passing of the brake test; and when the measured brake current does not meet or exceed the predetermined threshold in the predetermined time period or if movement of the elevator is detected, then commanding the machinery brake controller to close both the first brake and the second brake, aborting the run, and issuing a fault code.

14. The method according to claim 13, wherein when the measured brake current does not meet or exceed the predetermined threshold in a predetermined time period, then determining the first brake to be defective.

15. The method according to claim 13, wherein when movement of the elevator is detected, then determining the second brake to be defective.

16. The method according to claim 13, wherein the method in an automatic brake test comprises a further step in which the brake test is repeated as soon as possible when the machinery brake failed the test until the machinery brake fails three consecutive tests, whereby further runs are prevented.

17. The method according to claim 13, wherein the machinery brake test is repeated in the reverse order so that the machinery brake controller is in the first step commanded to open only the second brake.

* * * * *